(12) United States Patent  
Wu et al.

(10) Patent No.: US 9,152,171 B1  
(45) Date of Patent: Oct. 6, 2015

(54) SPHEROIDAL PIVOT FOR AN ELECTRONIC DEVICE

(71) Applicant: Z124, Georgetown, KY (US)

(72) Inventors: Chun-Ting Wu, Banciao (TW); Chen-Pang Chuang, Zhonghe (TW)

(73) Assignee: Z124, San Jose, CA (US)

( * ) Notice: Subject to any disclaimer, the term of this patent is extended or adjusted under 35 U.S.C. 154(b) by 4 days.

(21) Appl. No.: 14/174,730

(22) Filed: Feb. 6, 2014

Related U.S. Application Data

(62) Division of application No. 13/008,798, filed on Jan. 18, 2011, now Pat. No. 8,648,821.

(51) Int. Cl.  
*G06F 1/16* (2006.01)

(52) U.S. Cl.  
CPC ........................................ *G06F 1/16* (2013.01)

(58) Field of Classification Search  
USPC ....................................................... 455/575.4  
See application file for complete search history.

(56) References Cited

U.S. PATENT DOCUMENTS

| | | | |
|---|---|---|---|
| 5,247,285 A | 9/1993 | Yokota et al. |
| 5,375,076 A | 12/1994 | Goodrich et al. |
| 5,768,163 A | 6/1998 | Smith, II |
| 5,926,364 A | 7/1999 | Karidis |
| D416,003 S | 11/1999 | Schiefer |
| 6,341,061 B1 | 1/2002 | Eisbach et al. |
| 6,351,372 B1 | 2/2002 | Kim |
| 6,353,529 B1 | 3/2002 | Cies |
| 6,430,038 B1 | 8/2002 | Helot et al. |
| 6,437,974 B1 | 8/2002 | Liu |
| 6,464,195 B1 | 10/2002 | Hildebrandt |
| 6,480,374 B1 | 11/2002 | Lee |
| 6,483,445 B1 | 11/2002 | England |
| 6,781,823 B1 | 8/2004 | Nyack |
| 6,829,140 B2 | 12/2004 | Shimano et al. |
| 6,845,005 B2 | 1/2005 | Shimano et al. |
| 6,903,927 B2 | 6/2005 | Anlaff |
| 6,972,944 B2 | 12/2005 | Clapper |
| D519,500 S | 4/2006 | Maskatia et al. |
| 7,035,665 B2 | 4/2006 | Kido et al. |
| 7,061,472 B1 | 6/2006 | Schweizer et al. |
| 7,068,497 B2 | 6/2006 | Chu |
| 7,107,084 B2 | 9/2006 | Duarte |
| 7,180,731 B2 | 2/2007 | Titzler et al. |
| 7,215,538 B1 | 5/2007 | Chen et al. |
| 7,239,505 B2 | 7/2007 | Keely et al. |
| 7,255,317 B2 | 8/2007 | Huang |

(Continued)

*Primary Examiner* — Nicholas Lee  
*Assistant Examiner* — Sepideh Ghafari  
(74) *Attorney, Agent, or Firm* — Haverstock & Owens LLP

(57) ABSTRACT

A multi-positionable computer comprises a user interface portion and a processing portion. The user interface portion includes a path along its back surface. The user interface portion can include a slot for receiving computer peripherals. The processing portion includes a connecting member for slidably coupling the processing portion to the user interface portion, and a rolling surface for contacting an external surface. The processing portion allows the user interface portion to be oriented in one of a plurality of positions along the path. In one orientation of the user interface portion, content is automatically displayed to align with the orientation of the user interface portion. In some embodiments, a virtual keyboard is displayed when the user interface portion is oriented in a predetermined position. The processing portion includes sides adjacent to the rolling surface. In some embodiments, ports and/or connections are accessible from at least one of the sides.

11 Claims, 5 Drawing Sheets

(56) References Cited

U.S. PATENT DOCUMENTS

| | | |
|---|---|---|
| 7,280,348 B2 | 10/2007 | Ghosh |
| 7,293,747 B2 | 11/2007 | Wang et al. |
| D557,695 S | 12/2007 | Cheng et al. |
| 7,353,053 B2 | 4/2008 | Prichard et al. |
| D580,429 S | 11/2008 | Cheng et al. |
| 7,457,108 B2 | 11/2008 | Ghosh |
| 7,492,891 B2 | 2/2009 | Eldon |
| 7,502,222 B2 | 3/2009 | Cheng et al. |
| D590,388 S | 4/2009 | Price et al. |
| 7,565,414 B1 | 7/2009 | Love |
| 7,573,703 B2 | 8/2009 | Chuang |
| 7,633,745 B2 | 12/2009 | Sakaibara et al. |
| 7,652,873 B2 | 1/2010 | Lee |
| 7,708,240 B2 | 5/2010 | Homer et al. |
| 7,715,180 B2 | 5/2010 | Titzler et al. |
| 7,733,331 B2 | 6/2010 | Duarte et al. |
| 7,744,055 B2 | 6/2010 | Zeng et al. |
| 7,836,554 B2 | 11/2010 | Fu |
| 7,884,815 B2 | 2/2011 | Fraser et al. |
| 7,898,796 B2 | 3/2011 | Horie |
| 7,911,783 B2 | 3/2011 | Hsieh |
| 7,929,298 B2 | 4/2011 | Hsu |
| 7,934,689 B2 | 5/2011 | Chiu et al. |
| 8,118,274 B2 * | 2/2012 | McClure et al. .............. 248/688 |
| 8,208,249 B2 | 6/2012 | Chin et al. |
| 8,229,522 B2 | 7/2012 | Kim et al. |
| D669,467 S | 10/2012 | Ballout |
| 8,280,464 B2 | 10/2012 | Liu |
| 8,289,683 B2 | 10/2012 | Wang |
| 8,306,584 B2 | 11/2012 | Yeh et al. |
| 8,457,696 B2 | 6/2013 | Pegg |
| 8,648,821 B2 | 2/2014 | Wu et al. |
| 8,675,361 B1 * | 3/2014 | Jivani et al. .............. 361/679.59 |
| 2003/0030971 A1 | 2/2003 | Duarte |
| 2004/0057197 A1 | 3/2004 | Hill et al. |
| 2004/0135738 A1 | 7/2004 | Kim |
| 2004/0174666 A1 | 9/2004 | Brandenberg et al. |
| 2004/0228076 A1 | 11/2004 | Clapper |
| 2004/0233620 A1 | 11/2004 | Doczy |
| 2005/0052833 A1 | 3/2005 | Tanaka |
| 2005/0264983 A1 | 12/2005 | Chen |
| 2006/0056143 A1 | 3/2006 | Tatsukami et al. |
| 2006/0126284 A1 | 6/2006 | Moscovitch |
| 2006/0187626 A1 | 8/2006 | Ditzik |
| 2006/0264243 A1 | 11/2006 | Aarras |
| 2007/0182663 A1 | 8/2007 | Biech |
| 2007/0217131 A1 | 9/2007 | Kehr |
| 2007/0217135 A1 | 9/2007 | Chuang |
| 2007/0236873 A1 | 10/2007 | Yukawa et al. |
| 2007/0263067 A1 | 11/2007 | Huang et al. |
| 2008/0007904 A1 | 1/2008 | Chen |
| 2008/0024388 A1 | 1/2008 | Bruce |
| 2008/0068786 A1 | 3/2008 | Cheng et al. |
| 2008/0180892 A1 | 7/2008 | Lai |
| 2008/0207272 A1 * | 8/2008 | Thornton et al. .............. 455/566 |
| 2008/0232054 A1 | 9/2008 | Chen |
| 2008/0266767 A1 | 10/2008 | Nicholas et al. |
| 2009/0095854 A1 | 4/2009 | Forbes et al. |
| 2009/0190295 A1 | 7/2009 | Chin |
| 2009/0244832 A1 | 10/2009 | Behar et al. |
| 2010/0053876 A1 | 3/2010 | Widmer et al. |
| 2010/0064536 A1 | 3/2010 | Caskey et al. |
| 2011/0025176 A1 | 2/2011 | McClure et al. |
| 2011/0061277 A1 | 3/2011 | Demott |
| 2011/0161809 A1 | 6/2011 | Gilmour |
| 2011/0286170 A1 | 11/2011 | Liu |

* cited by examiner

SPHEROIDAL PIVOT FOR AN ELECTRONIC DEVICE

RELATED APPLICATION(S)

This application is a divisional application of co-pending U.S. patent application Ser. No. 13/008,798, filed on Jan. 18, 2011, and entitled "Spheroidal Pivot for an Electronic Device," which is hereby incorporated by reference.

FIELD OF THE INVENTION

The present invention relates to pivots for electronic devices. More particularly, the present invention relates to spheroidal pivots for electronic devices.

BACKGROUND OF THE INVENTION

All-in-one (AIO) computers are more compact than their counterpart traditional desktop computers, which makes AIO computers appealing to consumers. For example, a screen and a computing system are integrated as one unit to optimize a user's work space. FIG. 1A illustrates an exemplary prior art AIO computer 100. The prior art AIO computer 100 is a unit 105 integrating a screen and a computing system. The unit 105 is supported by a stand 110. Peripheral devices, such as a keyboard 115, a mouse 120 and a speaker 125, are typically in communication with the unit 105. Although the prior art AIO computer 100 saves space, the prior art AIO computer 100 is still bulky and has power and heat limitations because of the integration of two electronic devices (i.e., a screen and a system) into one. Furthermore, orientation of the unit 105 is limited since the unit 105 is typically mounted to a stationary stand 110, which makes any touch screen feature of the AIO computer 100 infeasible to operate.

For another example, a keyboard and a computing system are integrated as one unit to optimize a user's work space. FIG. 1B illustrates another exemplary prior art AIO computer 150. The prior art AIO computer 150 is a unit 155 integrating a keyboard and a computing system. The unit 155 is typically in communication with a monitor 160. Although the prior art AIO computer 150 similarly saves space, the prior art AIO computer 150 also suffers the same drawbacks as the prior art AIO computer 100. In particular, the prior art AIO computer 150 is bulky and has power and heat limitations because of the integration of two electronic devices (i.e., a keyboard and a screen) into one.

What is needed is an AIO computer that is compact yet addresses power and heat limitations associated with the integration of a computing system with another electronic device.

SUMMARY OF THE INVENTION

Embodiments of the present invention are directed towards a spheroidal pivot for an electronic device. The electronic device is typically a display panel. The spheroidal pivot typically includes a roller base and an arm. The roller base includes system circuitry, I/O ports, and connections to external drives. The arm couples the roller base with the display panel, and allows the roller base to roll along a path located on the display panel such that the display panel is oriented in a plurality of positions.

In one aspect, an all-in-one computer includes a display including a back panel, a track along a portion of the back panel, and a computing system configured as a support member for the display. The support member is typically configured to roll along the track. In some embodiments, the display is encased in a frame such that a slot exists between a portion of the display and the bottom of the frame for receiving computer peripherals. In some embodiments, the track is disposed within the back panel. Typically, the support member includes an arm that is removably engaged with the track. The support member includes processing circuitry, input/output ports, and a disc drive. In some embodiments, the support member includes a spring member for absorbing impact to the display. Alternatively, the support member includes material for absorbing impact to the display. In some embodiments, the computer further includes a sensor to determine an orientation of the display. When the display is in a first orientation, the display is in a non-touch mode, and when the display is in a second orientation, the display is in a touch mode. Typically, in the touch mode, a virtual keyboard appears on the display. In some embodiments, the sensor is located at a portion of the display, and upon the sensor detecting a presence of the support member, the display is in the touch mode. Alternatively, the sensor is located at a portion of the display, and upon the sensor detecting the support member passing the sensor, the display transitions between one input mode and another input mode.

In another aspect, a multi-positional computer includes a user interface portion for displaying content. The user interface portion includes a path along its back surface. The multi-positional computer also includes a processing portion. The processing portion includes a connecting member for slidably coupling the processing portion to the user interface portion. The processing portion also includes a rolling surface for contacting an external surface. The processing portion allows the user interface portion to be oriented in one of a plurality of positions along the path. In some embodiments, at least a section of the rolling surface includes an anti-skid material. In some embodiments, the processing portion further includes a latch that engages the user interface portion to prevent the processing portion from sliding along the path. Typically, the processing portion further includes sides adjacent to the rolling surface. In some embodiments, input/output ports and connections to external drives are accessible from at least one of the sides. In some embodiments, the multi-positional computer further includes a sensor to detect an orientation of the user interface portion. An output of the user interface portion is typically configured to automatically align with an orientation of the user interface portion. In some embodiments, the user interface portion automatically displays a virtual keyboard when the user interface portion is oriented in a predetermined position.

In yet another aspect, a processing unit includes a spheroidal housing. The spheroidal housing typically includes an external rolling surface and sides adjacent to the external rolling surface, internal processing circuitry, and input/output ports accessible from at least one side. The processing unit also includes an arm extending from the external rolling surface. The arm is configured to removably couple with a display panel.

In yet another aspect, a display panel including a screen on a front side of the display panel, and a track on a back side of the display panel. The track is configured to receive a ball-bearing arm of a base such that the arm is able to slide within the track to orient the display panel in one of a plurality of positions along the track.

Other features and advantages of the present invention will become apparent after reviewing the detailed description of the embodiments set forth below.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed towards a spheroidal pivot for an electronic device. The electronic device is typically a flat display panel. The spheroidal pivot provides support for the display panel and typically includes a roller base and an arm. In some embodiments, the roller base is ball-shaped, although the roller base may be barrel-shaped (e.g., slightly horizontally elongated) to provide for greater stability and support during use. The arm couples the roller base with the display panel, and allows the arm to roll along a path located on the display panel such that the display panel can be oriented in any of a plurality of positions. In some embodiments, the roller base further includes a spring member, cushion, or the like for absorbing impact to the display panel during use. The roller base of the present invention not only provides support for the display panel, but the roller base also includes a computing system. The computing system is separate from the display panel and a keyboard. Instead, the computing system is in its own housing, which advantageously reduces the thickness of the display panel and keyboard, and eliminates power and heat limitations associated with prior art all-in-one (AIO) computers. The roller base includes system circuitry (e.g., motherboard, printed circuit board), I/O ports, connections to external drives, and/or other components typical of a computer system (e.g., connector to the display panel, power connection, fan). An AIO computer of the present invention includes the display panel and the spheroidal pivot.

Figure 1A:
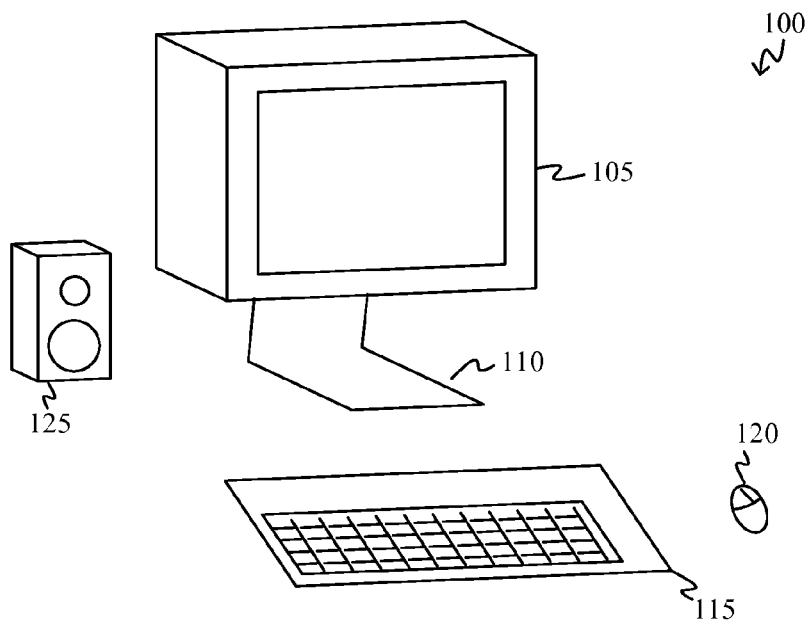
FIGS. 1A-1B illustrate exemplary prior art all-in-one (AIO) computers.
Figure 1B:
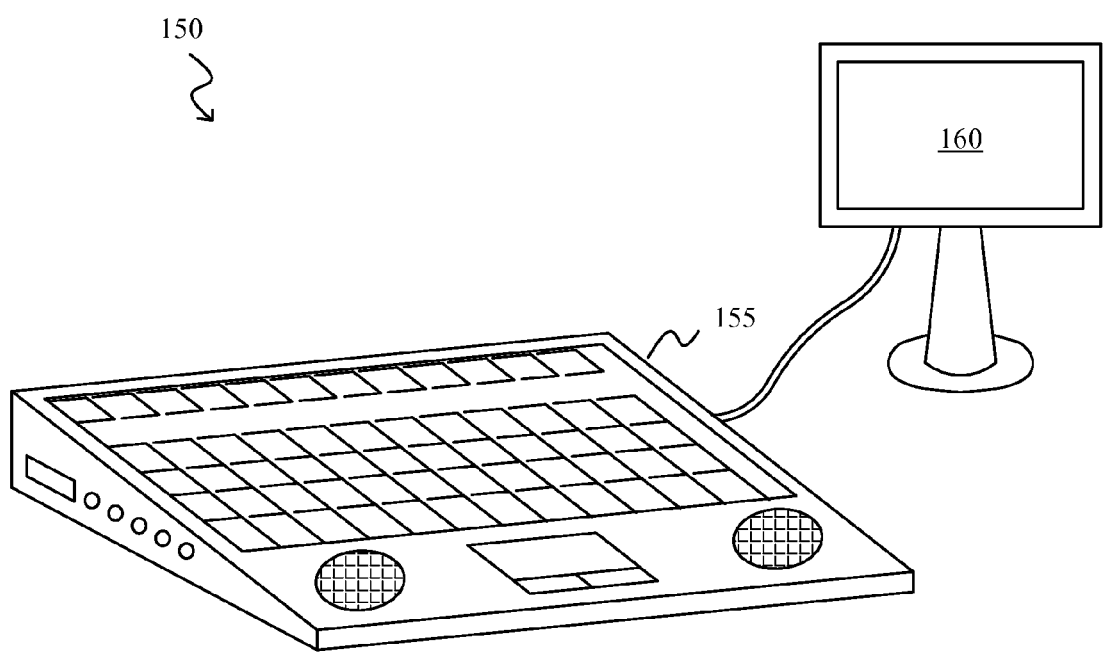
Figure 2A:
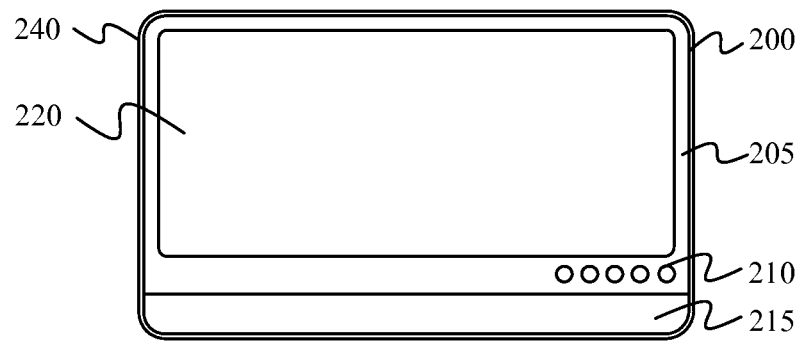
FIGS. 2A-2C illustrate different perspectives of an exemplary display panel in accordance with the present invention.
Figure 2B:
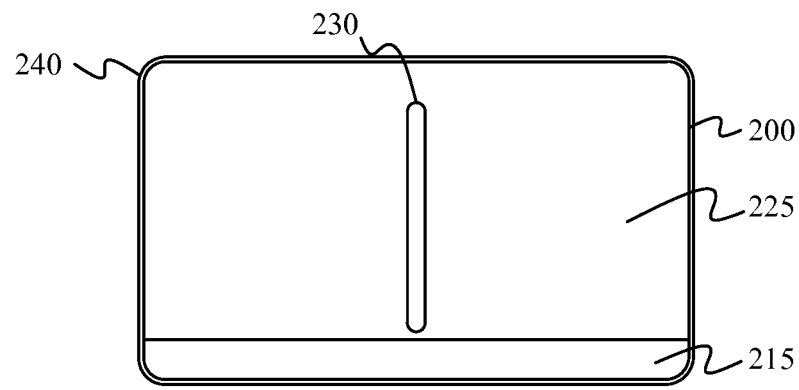
Figure 2C:
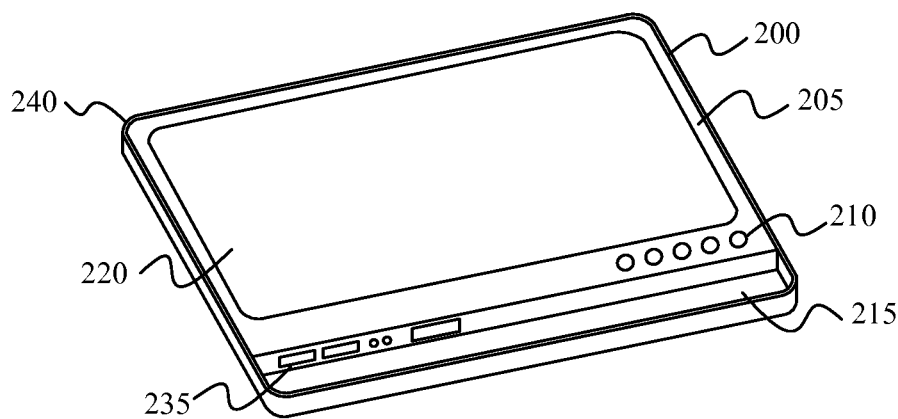

An exemplary display panel 200 is illustrated in FIGS. 2A-2C in accordance with the present invention. Particularly, FIGS. 2A-2C illustrate different perspectives of the exemplary display panel 200. Typically, the display panel 200 is thin and not bulky as compared to the prior art AIO computers because the display panel 200 is separate from the computing system. The computing system is typically located elsewhere, such as in a removable spheroidal pivot.

In some embodiments, the display panel 200 is encased in a frame 240 larger than the display panel 200 such that a slot 215 exists between a bottom of the display panel 200 and the bottom of the frame 240. The slot 215 can be used for receiving computer peripherals such as a keyboard (not illustrated) and a mouse (not illustrated) when, for example, the display panel 200 is positioned upright.

The display panel 200 comprises a front side 205 and a back side 225. As illustrated in FIG. 2A, a screen 220 is typically formed on the front side 205 of the display panel 200. Likewise, buttons 210 to control monitor settings are typically located on the front side 205, although the buttons 210 can be located elsewhere on the display panel 200. Ports and other connectors 235 are typically located on a bottom edge of the display panel 200, as illustrated in FIG. 2C, although the ports and other connectors 235 can also be located elsewhere on the display panel 200.

A track 230 is typically formed on the back side 225 of the display panel 200. In FIG. 2B, the vertical track 230 is located substantially at a center of the width of the back panel 225. In some embodiments, the track 230 is disposed in the back side 225. Alternatively, the track 230 is raised above the planar surface of the back side 225. The track 230 typically receives an arm of a spheroidal pivot. Since the arm of the spherical pivot can slide and stop anywhere along the track 230, the display panel 200 can be oriented in one of an infinite number of positions along the track 230. Alternatively, there are discrete locations along the track 230 in which the arm of the spherical pivot can stop at. Although the track 230 shown in FIG. 2B is shaped as a "|", the track 230 can be any shape including "+" shape. A "+" shape track allows the user to orient the display panel 200 from landscape to portrait and vice versa.

Figure 3A:
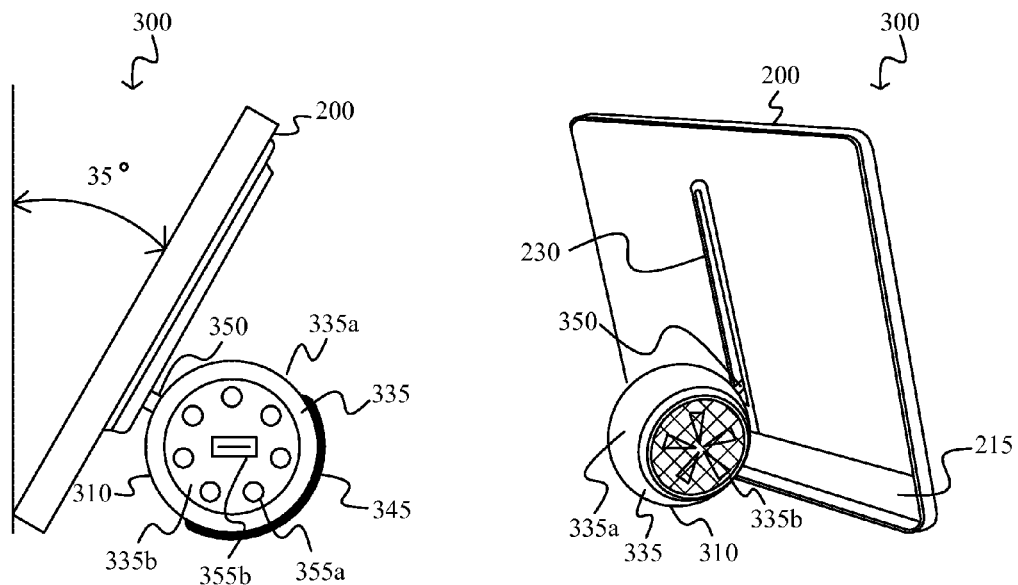
FIG. 3A illustrates different perspectives of an exemplary AIO computer in a first position in accordance with the present invention.
Figure 3B:
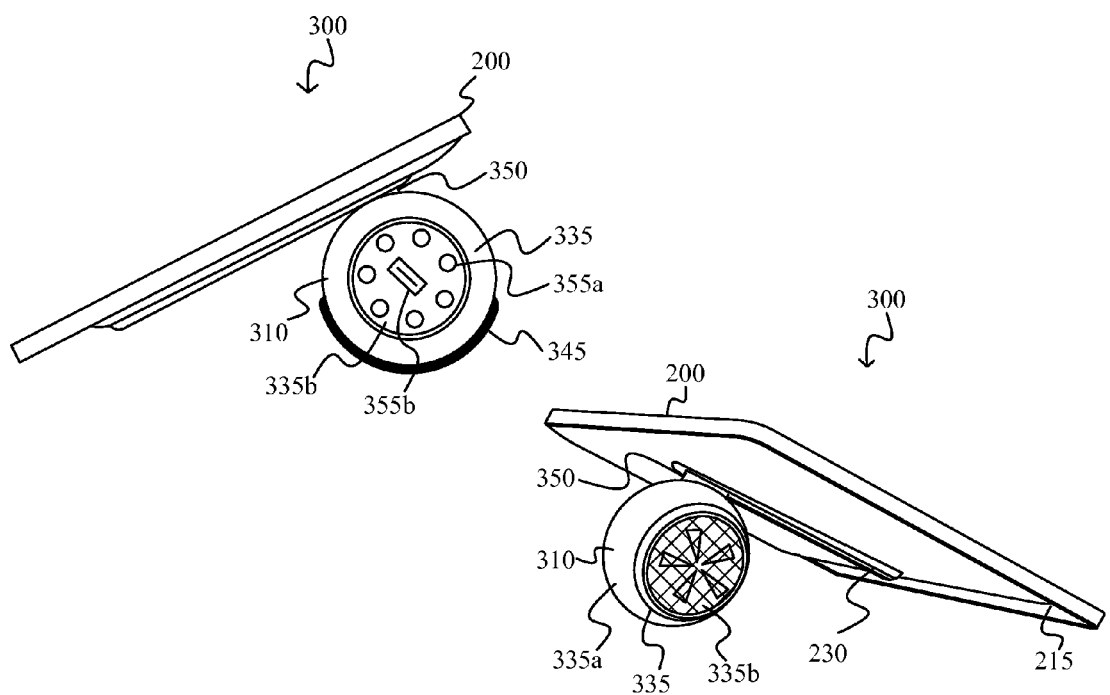
FIG. 3B illustrates different perspectives of the exemplary AIO computer of FIG. 3A in a second position in accordance with the present invention.

FIGS. 3A-3B illustrate an exemplary AIO computer 300 in accordance with the present invention. The AIO computer 300 comprises the display panel 200, such as the one illustrated in FIGS. 2A-2C, and a spheroidal pivot 310.

FIG. 3A illustrates two different perspectives of the AIO computer 300 in a first position in accordance with the present invention. When the AIO computer 300 is in the first position, the spheroidal pivot 310 is located at the bottom of the track 230. In some embodiments, when the AIO computer 300 is in this upright position, the display panel 200 is tilted at an angle of no greater than 35° from the vertical.

The spheroidal pivot 310 includes a roller base 335 and an arm 350. The roller base 335 includes internal system circuitry (not illustrated), I/O ports 355a, connections to external drives 355b, and/or other components typical (e.g., not illustrated) of a computer system. Typically, the motherboard layout and the printed circuit board layout within the roller base 335 are contoured to the unique shape of the roller base 335. The roller base 335 also includes a rolling surface 335a and sides 335b adjacent to the rolling surface 335a. In some embodiments, at least the I/O ports 355a, connections to external drives 355b, connector to the display panel 200, and power connection are located on one or more sides 335b of the roller base 335. In some embodiments, non-slip material 345, such as rubber, is formed on a portion of the rolling surface 335a to prevent the spheroidal pivot 310 from rolling when the display panel 200 is oriented in one of the plurality of positions along the track 230.

The arm 350 of the spheroidal pivot 310 is a connecting member for coupling the roller base 335 to the display panel 200. The arm 350 is sized to fit within the track 230 of the display panel 200, and is configured to slide within the track 230 of the display panel 200. In some embodiments, the coupling end of the arm 350 includes a ball-bearing module which allows the arm 350 to glide or slide within the track 230 in order to orient the display panel 200 in one of a plurality of positions along the track 230. Since the arm 350 of the spherical pivot 310 can slide and stop anywhere along the track 230, the display panel 200 can be oriented in one of an infinite number of positions along the track 230. Alternatively, there are discrete locations along the track 230 in which the arm 350 of the spherical pivot 310 can stop at. In some embodiments, the spheroidal pivot 310 also includes a latch or lock mechanism (not illustrated) that engages with the display panel 200 to prevent the spheroidal pivot from further sliding within the track 230 of the display panel 200.

Figure 6:
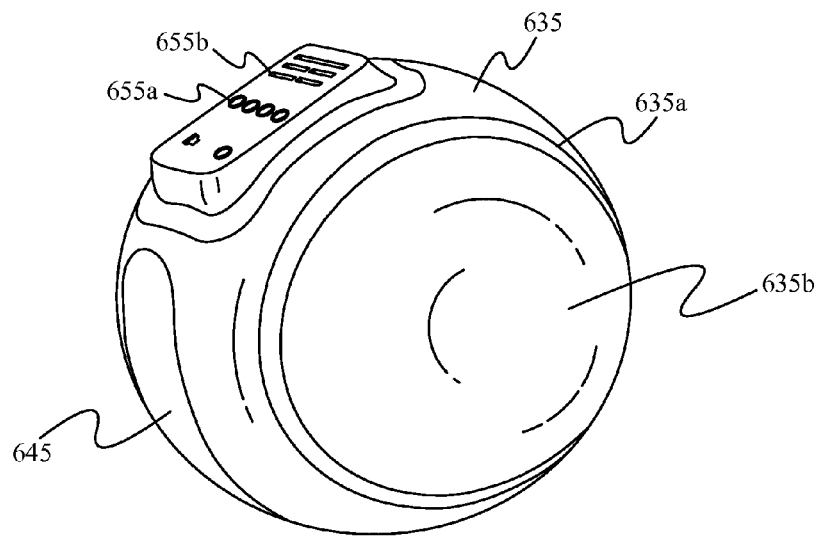
FIG. 6 illustrates another exemplary roller base in accordance with the present invention.

FIG. 6 illustrates another exemplary roller base 635 in accordance with the present invention. The roller base 635 includes internal system circuitry (not illustrated), I/O ports 655a, connections to external drives 655b, and/or other components typical of a computer system (not illustrated). The roller base 635 also includes a rolling surface 635a and sides 635b adjacent to the rolling surface 635a. In some embodiments, at least the I/O ports 655a, connections to external drives 655b, connector to the display panel, and power connection are located on a first portion of the rolling surface 635a of the roller base 635. In some embodiments, non-slip material 645, such as rubber, is formed on a second portion of the rolling surface 635a. In some embodiments, the first portion is positioned above the second portion such that the rolling of the roller base 635 does not hinder access to the I/O ports 655a, connections to external drives 655b, connector to the display panel, and power connection that are located on the first portion of the rolling surface 635a.

Figure 7:
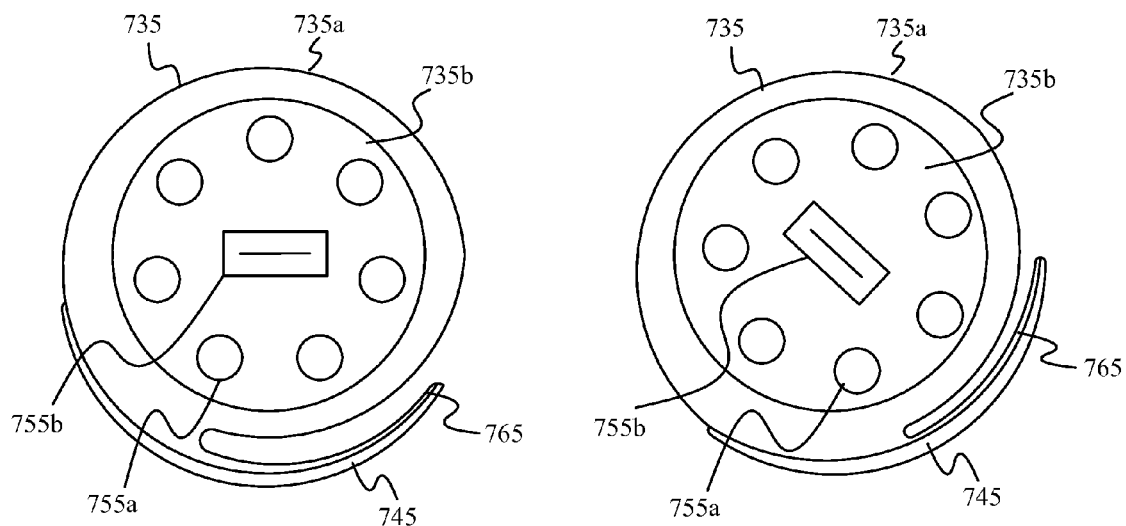
FIG. 7 illustrates yet another exemplary roller base in accordance with the present invention.

FIG. 7 illustrates yet another exemplary roller base 735 in accordance with the present invention. The roller base 735 is similarly configured as the roller base 335 of FIGS. 3A-3B, except that the roller base 735 further includes means to soften impact to an AIO system when a user touches a display panel that is coupled with the roller base 735. The roller base 735 includes internal system circuitry (not illustrated), I/O ports 755a, connections to external drives 755b, and/or other components typical of a computer system (not illustrated). The roller base 735 also includes a rolling surface 735a and sides 735b adjacent to the rolling surface 735a. At least the I/O ports 755a, connections to external drives 755b, connector to the display panel, and power connection are located on one or more sides 735b of the roller base 735. The rolling surface 735a includes means to soften impact to the AIO system when the user touches the display panel. For example, the rolling surface 735a can include a spring member 765 for absorbing impact to a display panel that is coupled to the roller base 735. The spring member 765 is configured to provide buoyancy when the spring member 765 is in contact with an external surface, such as a table. In some embodiments, non-slip material 745, such as rubber, is attached to a portion of the rolling surface 735a to prevent the spheroidal pivot from rolling when the display screen is oriented in one of the plurality of positions. As illustrated in FIG. 7, the portion of the rolling surface 735a includes the spring member 765.

For another example, the rolling surface can include material (not illustrated), such as neoprene or the like, to cushion the impact to the AIO system when the user touches the display screen.

Referring back to FIGS. 3A-3B, when the spheroidal pivot 310 slides from the bottom of the track 230 to the top of the track 230, the display panel 200 is in a second position. Between the first position (FIG. 3A) and the second position (FIG. 3B), there are a plurality, even an infinite number, of positions the display panel 200 can be oriented. FIG. 3B illustrates two different perspectives of the AIO computer 300 of FIG. 3A in the second position in accordance with the present invention. When the AIO computer 300 is in the second position, the spheroidal pivot 310 is located at the top of the track 230 of the display panel 200.

As discussed above, a portion of the rolling surface 335a includes non-slip material 345. In some embodiments, the portion of the rolling surface 335a including non-slip material 345 covers the surface of the roller base 335 that contacts an external surface, such as a table, when the AIO computer 300 is in this second position. Since at least the I/O ports 355a, connections to external drives 355b, connector to the display panel 200, and power connection are located on one or more sides 335b of the roller base 335 rather than on the rolling surface 335a, the I/O ports 355a, connections to external drives 355b, connector to the display panel 200, and power connection remain accessible when the spheroidal pivot 310 is located at the top of the track 300. However, as discussed elsewhere, ports and connections can be located elsewhere on the roller base 335 without hindering access to these ports and connections.

Typically, a user has the display panel 200 in the first position (FIG. 3A) when the user is sitting (e.g., the display panel 200 is typically at eye level), and has the display panel 200 in the second position (FIG. 3B) when the user is standing (e.g., the user is above the display panel 200). When the display panel 200 is in at least the first position, the AIO computer 300 is typically in non-touch mode. In other words, the user uses a keyboard and a mouse as input devices. (The keyboard and mouse can be stored in the slot 215.) However, the user is able to manually change modes from non-touch mode to touch mode. In touch mode, a virtual keyboard appears on the screen of the display panel 200. At least when the display panel 200 is in the second position, the AIO computer 300 is typically in the touch mode. However, the user is able revert the mode back to non-touch mode.

Figure 4:
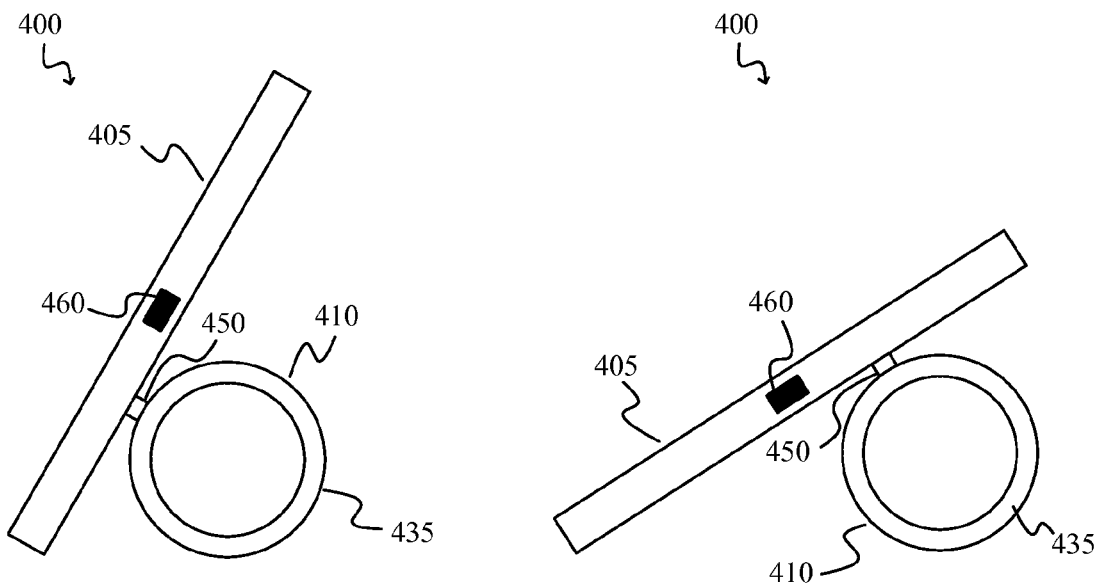
FIG. 4 illustrates another exemplary AIO computer in accordance with the present invention.

In some embodiments, the transition between the two modes is automatic and can be accomplished by including a sensor located in a display panel to detect the location of a spheroidal pivot. FIG. 4 illustrates an exemplary AIO computer 400 with such a sensor 460 in accordance with the present invention. As illustrated in FIG. 4, the sensor 460 is located at approximately a midpoint of the display panel 405. The spheroidal pivot 410, which includes the roller base 435 and the arm 450, is coupled to the display panel 405. In the left-most picture of FIG. 4, the spheroidal pivot 410 is located below or to the left of the sensor 460. Since the sensor 460 has not yet detected the passing of the spheroidal pivot 410, the AIO computer 400 is in non-touch mode. However, the user is able to manually change modes from non-touch mode to touch mode. When the sensor 460 detects the passing of the spheroidal pivot 410 from below (or left of) to at or above (or right of) the sensor 460, such as that illustrated in the right-most picture of FIG. 4, the AIO computer 400 automatically changes to touch mode, if not already in touch mode. However, the user is also able to manually revert the mode back to non-touch mode. Similarly, when the sensor 460 detects the passing of the spheroidal pivot 410 from above (or right of) to below (or left of) the sensor 460, the AIO computer 400 automatically changes to non-touch mode, if not already in non-touch mode.

Figure 5:
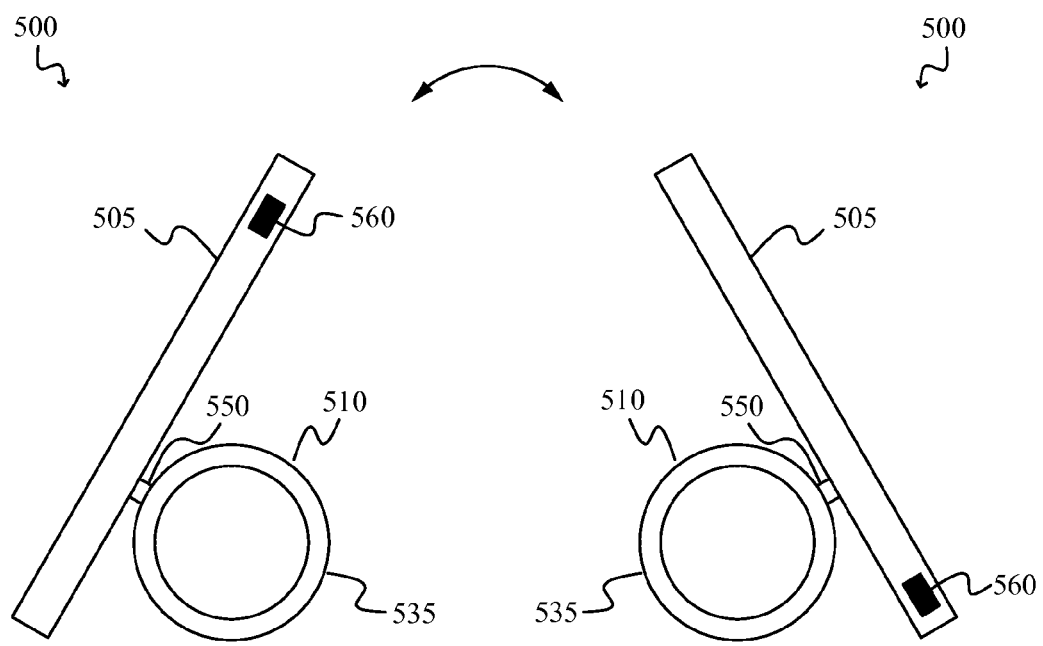
FIG. 5 illustrates yet another exemplary AIO computer in accordance with the present invention.

In some embodiments, instead of a sensor located at approximately a midpoint of a display panel, such as in FIG. 4, a sensor 560 is located at one end of the display panel 505, such as in FIG. 5. As illustrated in FIG. 5, the sensor 560 is located at approximately a top of the display panel 505. The spheroidal pivot 510, which includes the roller base 535 and the arm 550, is coupled to the display panel 505. In the left-most picture of FIG. 5, the spheroidal pivot 510 and the sensor 560 are located at opposite ends of the display panel 505. The spherical pivot 510 is located at the bottom of the display panel 505. Since the sensor 560 does not detect the presence of the spheroidal pivot 510, the AIO computer 500 is in non-touch mode. However, the user is able to manually change modes from non-touch mode to touch mode. When the display panel 505 is flipped (e.g., the spheroidal pivot 510 is located at the top of the display panel 505), the sensor 560 detects the presence of the spheroidal pivot 510, as illustrated in the right-most picture of FIG. 5. Once the sensor 560 detects the presence of the spheroidal pivot 510, the orientation of the output of the display panel 505 is automatically changed to align with the display panel 505. Furthermore, the AIO computer 500 automatically changes to touch mode, if not already in touch mode. However, the user is also able to manually revert the mode back to non-touch mode. Similarly, when the display screen 505 is flipped back (e.g., the sensor 560 does not detect the presence of the spheroidal pivot 510 because the spheroidal pivot 510 is located at the bottom of the display panel 505; left-most picture of FIG. 5), the orientation of the output of the display panel 505 is automatically changed to align with the display panel 505. Furthermore, the AIO computer 500 automatically changes to non-touch mode, if not already in non-touch mode. The user is also able to manually revert the mode back to touch mode. In this embodiment, the user is even able to use the AIO computer 500 when the AIO computer 500 is "flipped."

In addition or alternatively, the AIO computer of the present invention includes an accelerometer (not illustrated) configured to automatically change screen orientation to align with the display panel or to determine whether to display a virtual keyboard on the screen.

In some embodiments, a spheroidal pivot of the present invention is advantageously removable from a display panel of the present invention. When a display panel is nonfunctional, such as having a broken screen, but the spheroidal pivot is in working condition, the spheroidal pivot can be removed and mechanically and electrically coupled with another display panel. Similarly, when a spheroidal pivot is nonfunctional, such as having a broken hard drive or failed memory, but the display panel is in working condition, the nonfunctional spheroidal pivot can be removed and replaced.

The AIO system of the present invention is a zero-footprint computer, as it advantageously integrates components of a computing system with a stand or support. There is no traditional "box" that takes up space on the floor or desk. Since components of a computing system is not integrated with another electronic device, power and heat limitations associated with prior art all-in-one (AIO) computers are eliminated. Furthermore, since the support is configured to roll along a portion of a display panel, the display panel is able to be oriented in a plurality of positions, allowing the user to use the AIO system in an ergonomic manner.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. An all-in-one (AIO) computer comprising:
   a. a display including a track along a portion of a back panel of the display; and
   b. a computing system having a spheroidal housing with an arm configured as a support member for the display, wherein the arm is mounted and is configured to roll along the track.

2. The AIO computer of claim 1, wherein the display is encased in a frame such that a slot exists between a portion of the display and the bottom of the frame for receiving computer peripherals.

3. The AIO computer of claim 1, wherein the track is disposed within the back panel.

4. The AIO computer of claim 1, wherein the support member comprises an arm removably engaged with the track.

5. A multi-positional computer comprising:
   a. a user interface portion for displaying content; and
   b. a processing portion including:
      i. a spheroidal housing with an arm mounted for slidably coupling the processing portion to the user interface portion; and
      ii. a rolling surface for contacting an external surface, wherein the processing portion allows the user interface portion to be oriented in one of a plurality of positions.

6. The multi-positional computer of claim 5, wherein at least a section of the rolling surface includes an anti-skid material.

7. The multi-positional computer of claim 5, wherein the processing portion further includes a latch that engages the user interface portion to prevent the processing portion from sliding along a portion of the user interface portion.

8. The multi-positional computer of claim 5, wherein the processing portion further includes sides adjacent to the rolling surface, and wherein at least one of input/output ports and connections to external drives are accessible from at least one of the sides.

9. The multi-positional computer of claim 5, wherein an output of the user interface portion is configured to automatically align with an orientation of the user interface portion.

10. A processing unit comprising:
    a. a spheroidal housing including:
       i. an external rolling surface and sides adjacent to the external rolling surface;
       ii. internal processing circuitry; and
       iii. input/output ports and connectors accessible from at least one of the sides;
    and b. an arm extending from the external rolling surface, wherein the arm is configured to removably couple with a display panel.

11. The processing unit of claim 10, wherein an portion of the external rolling surface includes an anti-skid material, wherein the anti-skid material is configured to contact a surface.

* * * * *